(12) United States Patent
Requate et al.

(10) Patent No.: US 10,166,511 B2
(45) Date of Patent: Jan. 1, 2019

(54) METHOD FOR THE PRODUCTION OF A HOLLOW FIBER MODULE, AND HOLLOW FIBER MODULE

(71) Applicant: Sartorius Stedim Biotech GmbH, Goettingen (DE)

(72) Inventors: Wilhelm Requate, Heiligenstadt (DE); Gerid Hellwig, Niemetal (DE); Johannes Wortmeyer, Goettingen (DE); Ulrich Apelt, Ebergoetzen (DE)

(73) Assignee: Sartorius Stedim Biotech GmbH (DE)

( * ) Notice: Subject to any disclaimer, the term of this patent is extended or adjusted under 35 U.S.C. 154(b) by 137 days.

(21) Appl. No.: 15/121,054

(22) PCT Filed: Apr. 11, 2015

(86) PCT No.: PCT/EP2015/000766
§ 371 (c)(1),
(2) Date: Aug. 24, 2016

(87) PCT Pub. No.: WO2015/180810
PCT Pub. Date: Dec. 3, 2015

(65) Prior Publication Data
US 2017/0136415 A1    May 18, 2017

(30) Foreign Application Priority Data
May 28, 2014  (DE) .................. 10 2014 107 583

(51) Int. Cl.
*B01D 63/02* (2006.01)

(52) U.S. Cl.
CPC .......... *B01D 63/022* (2013.01); *B01D 63/02* (2013.01); *B01D 63/021* (2013.01);
(Continued)

(58) Field of Classification Search
None
See application file for complete search history.

(56) References Cited

U.S. PATENT DOCUMENTS

| 4,271,740 A | * | 6/1981 | Yamazaki | ............ B01D 63/021 83/356.3 |
| 5,059,374 A | | 10/1991 | Krueger et al. | |

(Continued)

FOREIGN PATENT DOCUMENTS

| DE | 10 2005 008 900 | 9/2006 |
| DE | 602 17 848 | 11/2007 |

(Continued)

OTHER PUBLICATIONS

International Search Report.
English Translation of International Preliminary Report for Application No. PCT/EP2015/000766 dated Nov. 29, 2016.

*Primary Examiner* — Chester T Barry
(74) *Attorney, Agent, or Firm* — Gerald E. Hespos; Michael J. Porco; Matthew T. Hespos

(57) ABSTRACT

A hollow fiber module (1, 1') is made by inserting a bundle of hollow fibers (3) into a housing (2, 2') that has an end closed by a cap (17). A fluid first component (27) that can assume a solid state is introduced into a space adjacent the cap (17) and forms a spacer into which ends of the hollow fibers (6, 7) project. A fluid curable second component (4) is introduced before the first component (27) via a second inflow (28) and is cured to form a sealing layer (9) that embeds the bundle of hollow fibers (3) and seals it with respect to the adjacent housing wall (29, 29'). The cap (17) is removed from the module housing (2, 2') along with the first component (27) and ends of the hollow fibers (6) embedded in the first component (27).

10 Claims, 3 Drawing Sheets

(52) U.S. Cl.
CPC ...... *B01D 2313/04* (2013.01); *B01D 2313/20* (2013.01); *B01D 2313/21* (2013.01)

(56) References Cited

U.S. PATENT DOCUMENTS

| | | |
|---|---|---|
| 5,531,848 A | 7/1996 | Brinda et al. |
| 6,180,038 B1 * | 1/2001 | Cesaroni ........... B29C 45/14467 264/135 |
| 2004/0129637 A1 * | 7/2004 | Husain ................ B01D 61/022 210/636 |
| 2008/0152893 A1 | 6/2008 | Stroh et al. |
| 2013/0149634 A1 | 6/2013 | Kim et al. |

FOREIGN PATENT DOCUMENTS

| | | | |
|---|---|---|---|
| GB | 1 379 511 | | 12/1971 |
| GB | 1379511 | * | 1/1975 |
| JP | 2-214527 | * | 8/1990 |
| WO | 97/28953 | | 8/1997 |
| WO | 00/06357 | | 2/2000 |
| WO | WO-0006357 A1 * | 2/2000 | ........... B01D 63/022 |
| WO | 03/051495 | | 6/2003 |
| WO | WO-03051495 A1 * | 6/2003 | ............. B01D 53/22 |
| WO | 2005/046847 | | 5/2005 |

\* cited by examiner

METHOD FOR THE PRODUCTION OF A HOLLOW FIBER MODULE, AND HOLLOW FIBER MODULE

BACKGROUND

1. Field of the Invention

The invention relates to a method for the production of a hollow fiber module, wherein in a first step a hollow fiber bundle is inserted into a module housing, and at least one end of the module housing is closed by a cap, wherein in a second step a fluid, first component which forms a spacer, and which can assume a solid state, is filled into an intermediate space arranged between the hollow fiber ends and the cap, via a first inflow, wherein the hollow fiber ends project into the first components, and wherein in a third step a fluid, curable second component is introduced upstream of the first component, directed away from the cap, via a second inflow, wherein the second component in the cured state forms a sealing layer which embeds the hollow fiber bundle and seals the same with respect to the adjacent module housing wall.

The invention further relates to a hollow fiber module with a hollow fiber bundle arranged in a module housing, having at least at one sealing layer, made of a cured component, on an end which is transverse to its longitudinal direction, wherein the sealing layer embeds the hollow fiber bundle and seals the same with respect to the adjacent module housing wall.

2. Description of the Related Art

A method for the production of a hollow fiber module is known from WO 00/06357 A1, wherein in a first step a hollow fiber bundle is inserted into a module housing, and at least one end of the module housing is closed by a cap. In a second step, a fluid first component which forms a spacer, and which can also assume a solid state, is filled via a first inflow into an intermediate space situated between the hollow fiber ends and the cap, wherein the hollow fiber ends project into the first component. In a third step, a fluid, curable, second component is introduced upstream of the first component, directed away from the cap, via a second inflow. The second component in the cured state forms a sealing layer which embeds the hollow fiber bundle and seals the same with respect to the adjacent module housing wall.

A disadvantage of the known method is that the cap is an integral part and cannot be removed. Therefore, the first component must be removed from the hollow fiber module. If the first component has solidified, it must be brought back into a liquid state with a solvent or by increasing the temperature. A further disadvantage is that after removal of the first component, the hollow fiber ends project out of the layer formed by the second component, and can possibly break off. In addition, an undesirable contamination can occur on the clean end.

The problem addressed by the present invention is that of providing a method for the production of a hollow fiber module, and of providing a hollow fiber module which is on the one hand easier and less expensive to manufacture, wherein, on the other hand, the hollow fiber ends of the hollow fiber bundle are protected from breaking off.

SUMMARY

The invention relates to a method for producing a hollow fiber module. The method includes inserting a hollow fiber bundle into a module housing. At least one and of the module housing is closed by a cap. The method then includes filling a spacer into an intermediate space arranged between the hollow fiber ends and the cap. The spacer may be a first fluid component that is filled via a first inflow and may then assume a solid state. The filling of the intermediate space may be carried out so that the hollow fiber ends projecting to the first component. The method may proceed by introducing a fluid curable second component upstream of the first component and directed away from the cap. The introduction of the fluid curable second component may be via a second inflow. The second component then may be cured to form a sealing layer that embeds the hollow fiber bundle and seals the hollow fiber bundle with respect to the adjacent module housing wall. After the curing of the second component, the cap, which is designed as a removable sprue cover, together with the first component, which forms a solidified plug, and the hollow fiber ends which are embedded in the plug and which project from the layer which forms the second component, is removed from the module housing.

Due to the removal of the cap designed as a sprue cover, together with the first component, which forms a solidified plug, and the hollow fiber ends which are embedded in the plug, there is no longer a need to dissolve and suction-off the first component, which is very time consuming. In addition, there are no fiber ends which project out of the cured layer of the second component and which can break off.

Furthermore, the method according to the invention creates greater freedom for the design of the hollow fiber module. In particular, the hollow fiber ends can terminate in a flat end face tat is recessed with respect to the adjacent, free end of the module housing by a prespecifiable distance. In this case, a difficult and time-consuming internal preparation is not necessary. In addition, caps tat can be attached later can have a simpler design.

The hollow fibers in the boundary layer formed by the first component and the second component may be severed when the sprue cover is removed. The end face of the second component may form a common plane surface with the hollow fiber ends, and does not need to receive any further processing in this case. The lumen of the hollow fibers is freely accessible without further preparation. The sprue cover in this case may be removed with a rotary, pulling motion. Due to the rotation, the hollow fiber ends of the boundary surfaces—that is, in the end face of the cured layer of the second component—are sheared off and severed; and due to the pulling movement, the sprue cover, together with the hollow fiber ends embedded in the plugs of the first component, is removed.

The module housing may be centrifuged in a centrifuge between introducing the first and second components. Additionally, after the solidification of the first component and prior to the curing of the second component, the module housing may be centrifuged once again. In this way, a flat layer can be formed in a relatively short time from each of the first and second components.

The hollow fiber bundle may be equipped with a support fabric before introducing the hollow fiber bundle. In this way, the hollow fiber bundle can be inserted more easily into the module housing. The hollow fiber bundle may be cut appropriately to a prespecified length before the insertion of the hollow fiber bundle into the module housing.

The first fluid component that is filled into the module housing may be silicone, and the second fluid component that is filled into the module housing may be polyurethane. Silicone has a certain elasticity and does not establish a solid bond with the cured polyurethane, such that the silicone plug separates at the interface between the first component and the second component relatively easily—that is, without excessive force—when the sprue cover is rotated. However, at the same time, it shears off the hollow fiber ends, severing the same at the interface between the first and second components.

Silicone may be filled into the module housing as the first fluid component, and an epoxy adhesive may be filled into the module housing as the second fluid component. Alternatively, a mixture of silicone and polyurethane in a ratio of 1:1, 1:2 or 1:3 can be used as the first fluid component, and polyurethane can be used as the second fluid component.

The position and thickness of the cured layer that is formed by the second component can be varied.

The invention also relates to hollow fiber module having a hollow fiber bundle arranged in a module housing having at least one sealing layer made of a cured second component on an and of the hollow fiber bundle that is transverse to the longitudinal direction. The ceiling layer embeds the hollow fiber bundle and seals the hollow fiber bundle with respect to the adjacent housing wall. The hollow fiber ends and the end face of the sealing layer facing the hollow fiber ends form a common plane in which the lumen of the hollow fibers is freely accessible. The end face of the sealing layer is recessed by a prespecifiable distance relative to the end face of the adjacent free end of the module housing.

Because the hollow fiber ends, and the end face of the sealing layer facing the hollow fiber ends, form a common plane in which the lumen of the hollow fibers is freely accessible, there is no need for a later process to open the hollow fiber ends. In addition, there are no free ends protruding from the sealing layer that could break off. Because the end face is recessed by a prespecifiable distance relative to the adjacent free end of the module housing, the hollow fiber module can have a relatively universal application. The space produced by the recessed end face can be used for other purposes, because it is not blocked by any exposed hollow fiber ends.

The module housing may be a rigid plastic housing. In this case, different connector or end caps can be welded or glued-on, by way of example.

The module housing may be designed as a flexible tube. The design as a flexible tube makes it possible for the free end of the module housing to be connected directly to a tube connector that is designed as a tube clip, for example.

The invention further relates to a cap for use as a sprue cover in the production of a hollow fiber module, as described above. The sprue cover may have a peripheral collar that can be inserted into the free end of the module housing and, when inserted, receives the free hollow fiber ends of the hollow fiber bundle. Thus, the collar is closed on its end that faces away from the hollow fiber bundle by an end wall. The sprue cover may have a first inflow for a first fluid component. Production may be simpler if the in-flow is arranged in the end wall of the sprue cover.

The peripheral collar may have a profiling or resistive element on its inner surface facing the hollow fiber bundle. The profiling and/or the resistance elements form, together with the first component fed into the cap, after its solidification, a positive-fit connection, such that the plug formed in the sprue cover cannot rotate relative to the sprue cover. This ensures that during rotation of the cap—the fiber ends are indeed sheared off.

Further features and advantages of the invention will become apparent from the following specific description and the drawings.

BRIEF DESCRIPTION OF THE DRAWINGS

FIG. 3 shows a side view in sketched cross-section of the hollow fiber module in FIG. 2, with the first component filled-in.

FIG. 4 shows a side view in sketched cross-section of the hollow fiber module in FIG. 3, with the second component filled-in.

DETAILED DESCRIPTION

Figure 1:
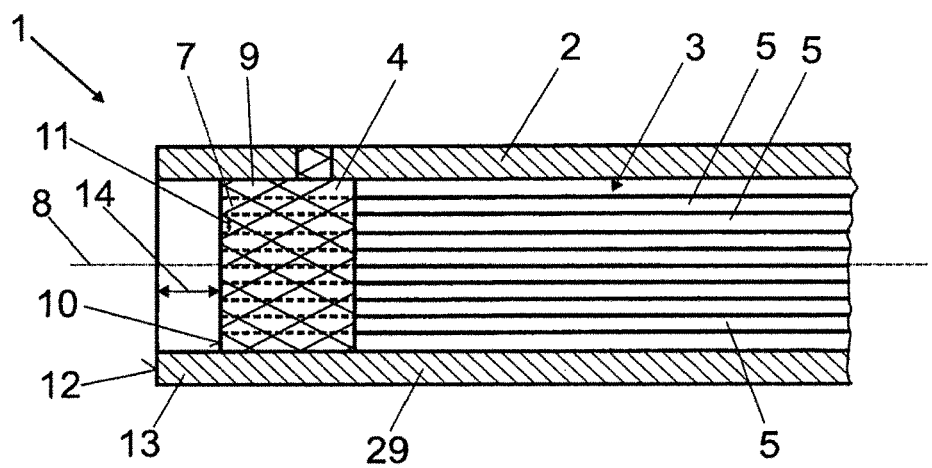
FIG. 1 shows a side view of a hollow fiber module in a sketched cross-section.
Figure 2:
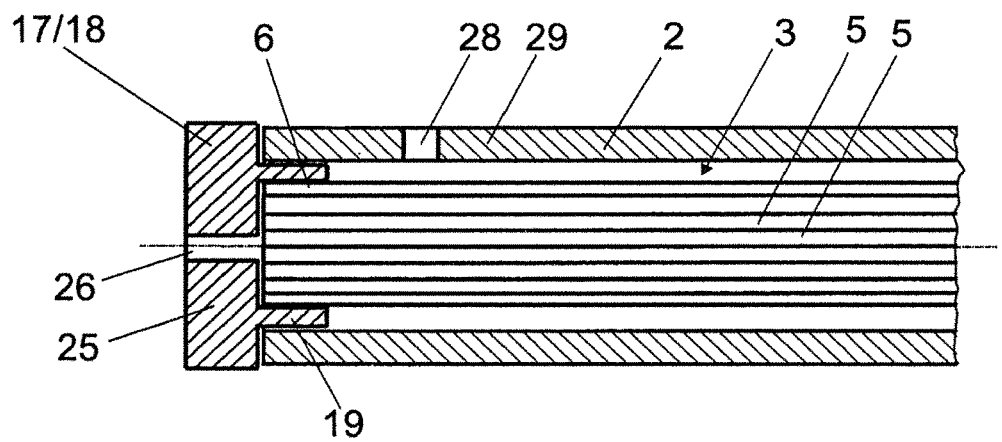
FIG. 2 shows a side view in sketched cross-section of a hollow fiber module with attached cap, still without fluid components.

A hollow fiber module 1 substantially comprises a module housing 2, a hollow fiber bundle 3 and a second component 4.

In the embodiments shown in FIGS. 1 to 5, the module housing 2 is designed as a relatively rigid plastic cylinder.

The hollow fiber bundle consists of a plurality of hollow fibers 5 with hollow fiber ends 6 in the initial state, and the hollow fiber ends 7 in the finished state.

The second component 4 forms a layer 9 transverse to the longitudinal axis 8 of the hollow fiber module 1, which when cured embeds the hollow fiber ends 7, and seals the hollow fiber bundle 3 with respect to the module housing 2. In the finished state, the layer 9 has an end face 10 which forms, together with the hollow fiber ends 7, a common plane in which the lumen 11 of the hollow fibers 5 is freely accessible. The end face 10 of the sealing layer 9 is recessed relative to the end face 12 of the free end 13 of the module housing 2 by a prespecifiable distance 14.

Figure 6:
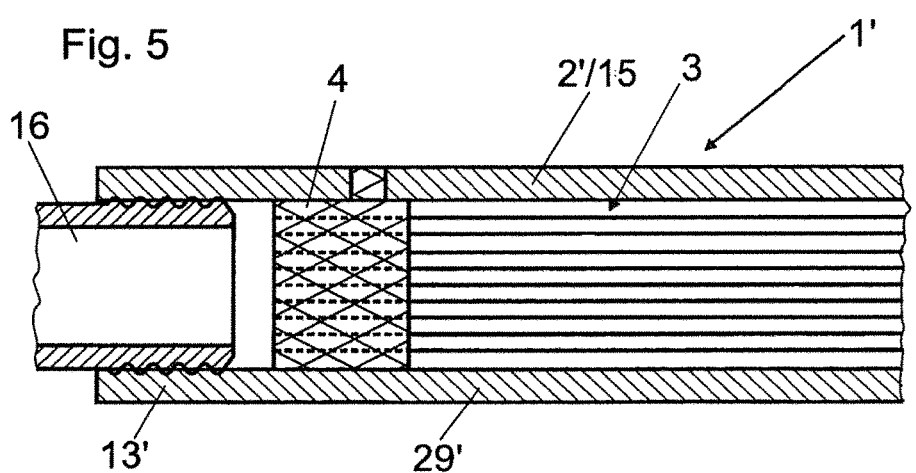
FIG. 6 shows a side view in sketched cross-section of a further hollow fiber module which is plugged into a tube clip.

In the embodiment shown in FIG. 6, the module housing 2' is designed as a flexible tube 15. The free end 13' of the module housing 2' can be connected as in FIG. 6 directly to a tube connector 16.

Figure 7:
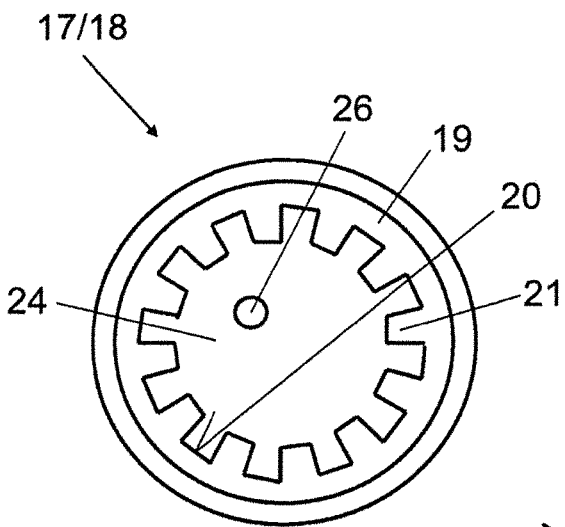
FIG. 7 shows a plan view of a cap designed as a sprue cover, with a collar and an inner surface which has a profiling.
Figure 8:
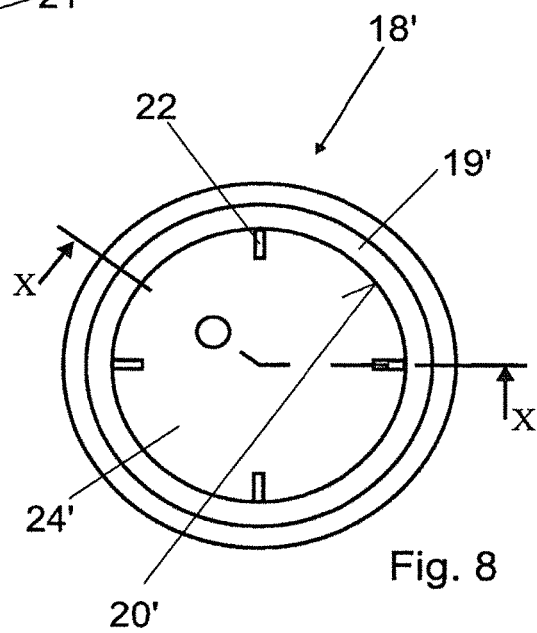
FIG. 8 shows a plan view of a cap designed as a sprue cover, with a collar and an inner surface which has a resistive element.
Figure 9:
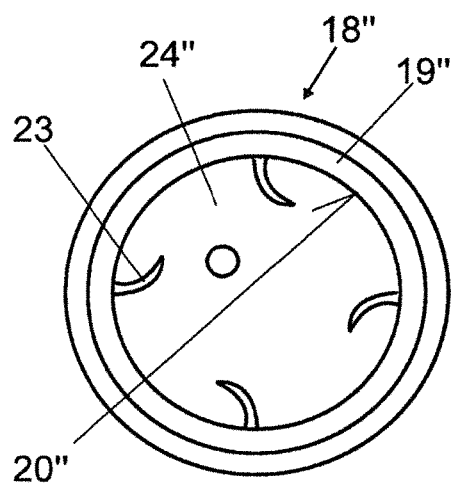
FIG. 9 shows a plan view of a cap designed as a sprue cover, with a collar and an inner surface which has a resistive element.
Figure 10:
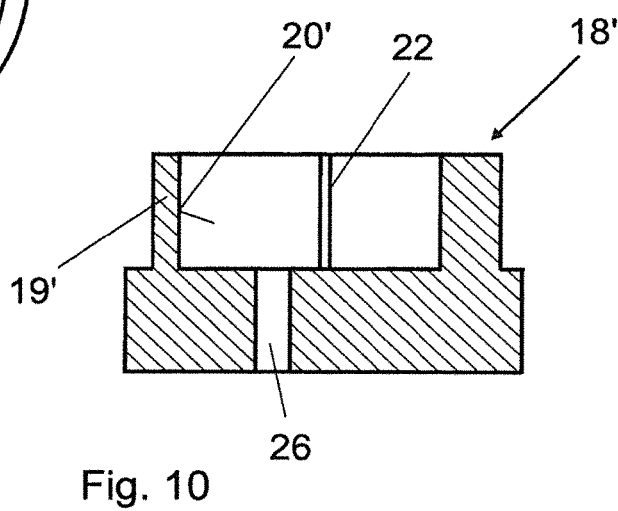
FIG. 10 shows a side view in cross-section of the cap in FIG. 8, cut along the line X-X.

To produce a hollow fiber module 1, 1', in a first step the hollow fiber bundle 3 is inserted into the module housing 2, 2'. For ease of insertion, the hollow fiber bundle 3 can be provided with a supporting fabric, which is not shown. On its free end 13, 13', the module housing 2, 2' is closed by a cap 17 which is designed as a removable sprue cover 18. The sprue cover 18 comprises a circumferential collar 19, which can be inserted into the free end 13 of the module housing 2 in such a manner that it receives the free hollow fiber ends 6 and encloses the hollow fiber bundle 3 with its inner surface 20. The collar 19 of the sprue cover 18 can have on its inner surface 20, enclosing an internal space 24, a profiling 21 (see FIG. 7). As in FIGS. 8 and 10, the sprue cover 18' can also have on its inner surface 20', enclosing the cavity 24', resistive elements 22 in the form of radial ribs. According to FIG. 9, the sprue cover 18" can have, on the inner surface 20" of the collar 19" which surrounds the internal space 24", resistive elements 23 which project in an arc shape into the internal space 24". The sprue cover 18, 18', 18" has, on its end of the collar 19, 19', 19" which faces away from the hollow fiber bundle 3, an end wall 25. A first inflow 26 for a first component 27 is arranged in the end wall 25.

Figure 3:
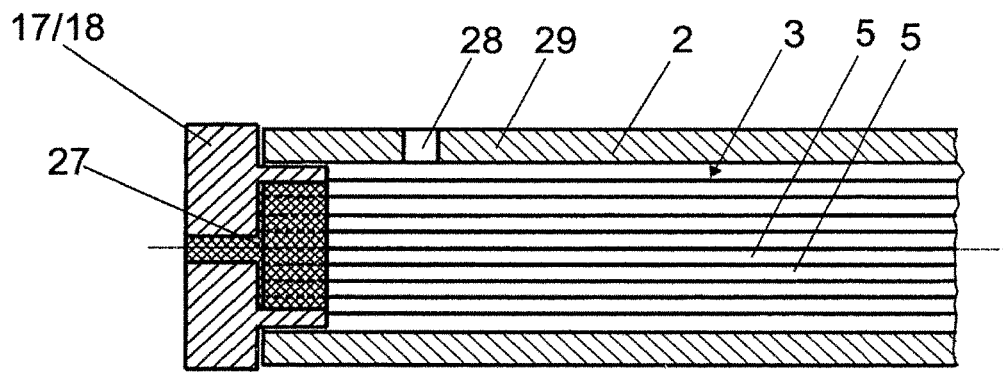
Figure 4:
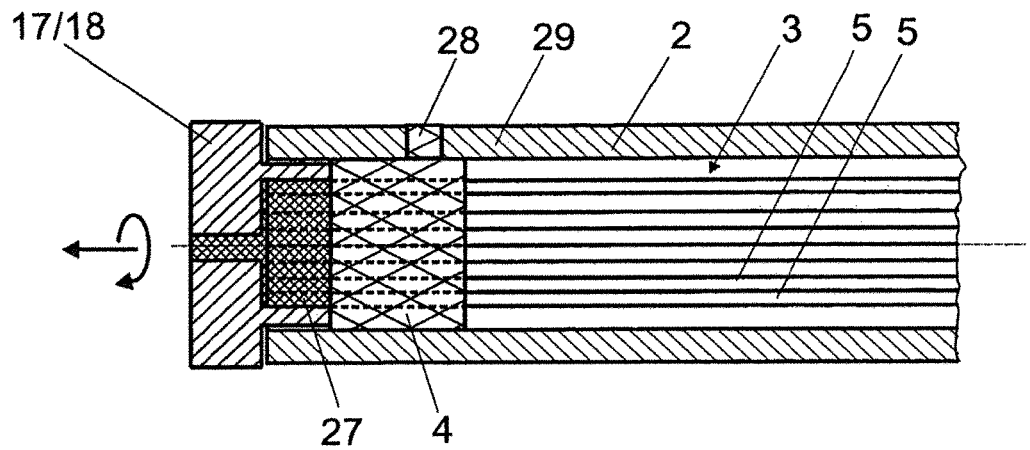
Figure 5:
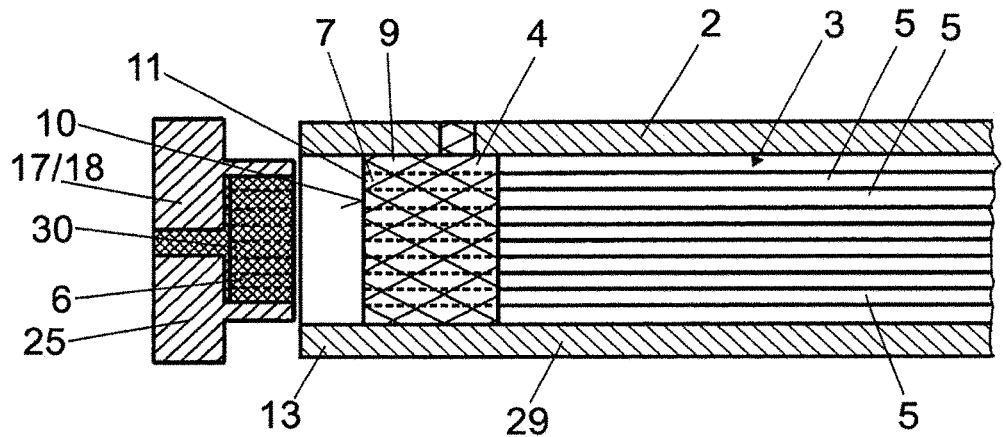
FIG. 5 shows a side view in sketched cross-section of the hollow fiber module in FIG. 4, with the sprue cover pulled out, including a plug, from the first component, and with the hollow fiber ends sheared off.

After the module housing 2 has been sealed on its free end by the cap 17, in a second step the fluid first component 27 is filled into an intermediate space arranged between the hollow fiber ends 6 and the cap 17, via the first inflow 26 of the cap 17 and/or the sprue cover 18, wherein the hollow fiber ends 6 project into the first component 27 (see FIG. 3). Optionally, prior to the subsequent third step and before the solidification of the first component 27, the module housing 2, with the hollow fiber bundle 3 inserted, and with the sprue cover 18, and with the first component 27 filled into the same, can be centrifuged in a centrifuge which is not illustrated. In a third step, the fluid second component 4 has a second inflow 28 (see FIG. 4) arranged in the module housing 2. Optionally, after the solidification of the first component 27, and prior to the curing of the second component 4, the module housing 2, with the hollow fiber bundle 3 and the cap 7, is again centrifuged. When cured, the second component 4 forms the layer 9, embedding the hollow fiber bundle 3, and creating a seal with respect to the adjacent module housing wall 29.

After the curing of the second component 4, the sprue cover 18, including the first component 27 which forms the solidified plug 30, together with the hollow fiber ends 6 embedded in the plug 30, the same protruding from the end face 10 of the layer 9 formed by the second component 4, is removed. The sprue cover is removed in a rotating, pulling motion. Due to the rotating motion, the hollow fiber ends 6 are sheared off and the sprue cover 18 can be pulled out, with the plug 30 and the embedded hollow fiber ends 6.

According to the embodiments, silicone is filled into the module housing 2 as the first fluid component 27, and polyurethane is filled into the module housing 2 as the second fluid component 4. In another embodiment of the invention which is not illustrated, silicone is filled into the module housing as the first fluid component, and as the second fluid component, an epoxy adhesive is filled into the module housing. Alternatively, a mixture of silicone and polyurethane in a ratio of 1:1, 1:2 or 1:3 can be used as the first fluid component, and polyurethane can be used as the second fluid component.

Of course, the embodiments discussed in the specific description and shown in the figures only represent illustrative embodiments of the present invention. The present disclosure provides a person skilled in the art with a wide spectrum of variation options.

LIST OF REFERENCE NUMBERS 1, 1' hollow fiber module
2, 2' module housing
3 hollow fiber bundle
4 second component
5 hollow fiber module
6 hollow fiber end (initial state)
7 hollow fiber end (finished state)
8 longitudinal axis of 1
9 layer of 4
10 end face of 9
11 lumen of 5
12 end face of 2
13, 13' free end of 2/15
14 distance
15 tube of 2
16 tube connection
17 cap
18, 18', 18" sprue cover
19, 19', 19" collar of 18
20, 20', 20" inner surface of 19
21 profiling
22 resistive elements
23 resistive elements
24, 24', 24" internal space
25 end wall
26 first inflow
27 first component
28 second inflow of 2
29 module housing wall of 2
30 plug of 27

The invention claimed is:

1. A method for producing a hollow fiber module (1, 1'), comprising:
   inserting a hollow fiber bundle (3) into a module housing (2, 2') that has an end closed by a cap (17) that defines a removable sprue cover (18, 18', 18");
   filling a fluid first component (27) via a first inflow (26) and into an intermediate space arranged between the hollow fiber ends (6, 7) and the cap (17) to form a spacer, the fluid first component (27) being formed from a material that can assume a solid state and being filled so that the hollow fiber ends (6, 7) project into the first component (27);
   introducing a fluid curable second component (4) upstream of the first component (27), directed away from the cap (17), via a second inflow (28);
   curing the second component (4) to form a sealing layer (9) that embeds the hollow fiber bundle (3) and seals the hollow fiber bundle (3) with respect to an adjacent module housing wall (29, 29');
   applying a rotary pulling movement to the cap (17) and thereby severing the hollow fibers (5) in a boundary layer formed by the first component (27) and the second component (4); and
   removing from the module housing (2, 2') an assembly that includes: the cap (17), the first component (27) that has been solidified to form a plug (30), and the hollow fiber ends (6) embedded in the plug (30) and projecting out of the end face (10) of the layer (9) formed by the second component (4).

2. The method of claim 1,
   further comprising
   centrifuging the module housing (2, 2') in a centrifuge between the second filling of the fluid first component (27) and the introducing of the fluid curable second component (4).

3. The method of claim 2,
   further comprising
   centrifuging the module housing (2, 2') again after solidification of the first component (27) and before the curing of the second component (4).

4. The method of claim 1,
   further comprising providing the hollow fiber bundle (3) with a supporting fabric before inserting the hollow fiber bundle (3) into the module housing (2, 2').

5. The method of claim 1, further comprising cutting the hollow fiber bundle (3) to a prespecified length before inserting the hollow fiber bundle (3) into the module housing (2, 2').

6. The method of claim 1, wherein silicone is filled into the module housing (2, 2') as the first fluid component (27), and polyurethane is filled into the module housing (2, 2') as the second fluid component (4).

7. A hollow fiber module (1, 1'), comprising: a module housing (2, 2'), a hollow fiber bundle (3) formed from hollow fibers (5) and arranged in the module housing (2, 2'), at least one sealing layer (9) made of a cured second component (4) disposed on an end of the hollow fiber bundle (3) and extending transverse to a longitudinal direction of the hollow fiber bundle (3), wherein the sealing layer (9) embeds the hollow fiber bundle (3) and seals the hollow fiber bundle (3) with respect to an adjacent module housing wall (29, 29'),
wherein
the hollow fibers have ends (7) that form a common plane with an end face (10) of the sealing layer (9), the hollow fibers (5) have lumens (11) that are freely accessible at the common plane defined by the ends (7) of the hollow fibers (5) and the end face (10) of the sealing layer (9), the end face (10) of the sealing layer (9) is recessed by a prespecifiable distance (14) with respect to an end face (12) of an adjacent free end (13, 13') of the module housing (2, 2'), and
the module housing (2') is a flexible tube.

8. The hollow fiber module of claim 7, wherein
the free end (13') of the module housing (2') is configured to be directly connected to a tube connector (16).

9. A cap (17) defining a sprue cover (18, 18', 18") for producing a hollow fiber module (1, 1'), the hollow fiber module (1, 1'), including: a module housing (2, 2'); a hollow fiber bundle (3) formed from hollow fibers (5) and being arranged in the module housing (2, 2'); at least one sealing layer (9) made of a cured second component (4) being disposed on an end of the hollow fiber bundle (3) and extending transverse to a longitudinal direction of the hollow fiber bundle (3), the sealing layer (9) embedding the hollow fiber bundle (3) and sealing the hollow fiber bundle (3) with respect to an adjacent module housing wall (29, 29'), the hollow fibers (5) having ends (7) that form a common plane with an end face (10) of the sealing layer (9), the hollow fibers (5) having lumens (11) that are freely accessible at the common plane defined by the ends (7) of the hollow fibers (5) and the end face (10) of the sealing layer (9), the end face (10) of the sealing layer (9) being recessed by a prespecifiable distance (14) with respect to an end face (12) of an adjacent free end (13, 13') of the module housing (2, 2'),
wherein
the sprue cover (18, 18', 18") comprises:
a circumferential collar (19, 19', 19") that can be inserted into the free end (13, 13') of the module housing (2 2'), and when inserted receives the free hollow fiber ends (6) of the hollow fiber bundle (3),
an end of the collar (19, 19', 19") that faces away from the hollow fiber bundle (3) is closed by an end wall (25), and
the sprue cover (18, 18', 18") has a first inflow (26) for a first fluid component (27).

10. The cap of claim 9, wherein
the circumferential collar (19, 19', 19") has a profiling (21) or resistive elements (22, 23) on its inner surface (20, 20', 20") facing the hollow fiber bundle (3).

* * * * *